United States Patent [19]

Kohin

[11] Patent Number: 4,871,220
[45] Date of Patent: Oct. 3, 1989

[54] SHORT WAVELENGTH PASS FILTER HAVING A METAL MESH ON A SEMICONDUCTING SUBSTRATE

[75] Inventor: Margaret Kohin, Woburn, Mass.

[73] Assignee: Litton Systems, Inc., Lexington, Mass.

[21] Appl. No.: 206,793

[22] Filed: Jun. 15, 1988

[51] Int. Cl.[4] .......................... G02B 1/02; G02B 5/20; H05K 9/00
[52] U.S. Cl. ..................................... 350/1.7; 350/311; 250/515.1
[58] Field of Search .......................... 350/1.1, 1.7, 311; 250/515.1

[56] References Cited

PUBLICATIONS

Danielewicz, E. J. et al., "Hybrid Output Mirror for Optically Pumped Far Infrared Lasers," *Optics Communications*, vol. 13, No. 4, Apr., 1975, pp. 366–369 (350/1.7).

Primary Examiner—Rodney B. Bovernick
Assistant Examiner—David J. Edmondson
Attorney, Agent, or Firm—Michael H. Wallach; Robert F. Rotella

[57] ABSTRACT

A short pass filter is disclosed which exhibits high transmission in the infrared and/or visible region of the electromagnetic spectrum and which has high rejection in the microwave portion of the spectrum. The filter generally consists of a substrate of semiconducting material, for example, n-type germanium which has been doped with a suitable dopant or grown with impurities to provide a substrate with a known conductivity. A metal mesh is placed either on one or on both surfaces of the substrate, or is buried within the substrate. The combination of the semiconducting material and metal mesh produce a filter which will transmit infrared and/or visible radiation while rejecting microwave radiation through absorption and reflection.

9 Claims, 3 Drawing Sheets

SHORT WAVELENGTH PASS FILTER HAVING A METAL MESH ON A SEMICONDUCTING SUBSTRATE

BACKGROUND OF THE INVENTION

1. Field of the Invewntion

This invention relates to infrared and visible radiation detectors in general and more particularly to a filter for use with infrared and visible sensors or detectors, specifically a filter which transmits short wavelength electromagnetic radiation and rejects, through reflection and absorption, long wavelength radiation.

2. Description of the Prior Art

The infrared and visible portions of the electromagnetic spectrum have become increasingly important for the collection and analysis of information for many applications, for example the remote sensing of weather information and tactical data acquisition. Infrared and visible detectors and sensors are frequently utilized in applications and environments in which they may be subject to unwanted, interfering or even damaging electromagnetic radiation, particularly from sources which emit electromagnetic radiation at microwave frequencies. It is known to place filter elements, i.e. windows, in front of infrared and visible detectors or sensors to shield them from damage by rejecting electromagnetic radiation falling outside of the frequency range of interest. Ideally, such a filter should have its pass and rejection characteristics matched to the spectral response of the infrared device that it is to be used with. That is, it should transmit infrared radiation within the frequency range of interest with minimum absorption or reflection loss and reject, through reflection and absorption, electromagnetic radiation outside of the band of interest, including signals at microwave frequencies. In the case of an ideal filter, there should be a sharp transition i.e., rolloff, between the wavelength of the signals which the filter passes and the wavelength which it rejects. In addition, the filter should have high transmission in the pass band and high rejection in the rejection band.

Filter elements which have heretofore been used with infrared sensors and detectors include windows manufactured from semiconducting materials, for example silicon or germanium. While filters of the foregoing type provide some rejection of microwave signals, they are not ideal because the attenuation that windows manufactured from semiconducting materials provide at microwave frequencies is either a constant or decreases with increasing wavelength. As a result, the windows must either be thicker or have higher conductivites than desired in order to meet microwave attenuation requirements. Still another form of prior known filter consists of an insulating window made from zinc sulfide or zinc selenide or glass on which a conducting wire mesh is deposited. While windows of the foregoing configuration are useful for passing infrared and visible radiation and for rejecting, by reflection or absorpotion, radiation outside of the infrared or visible regions of the electromagnetic spectrum, for example signals at microwave frequencies, they do not exhibit the characteristics of an ideal filter, that is, they do not exhibit a steep rolloff between signals within the frequency band that they pass and those signals falling outside the band of interest. In the case of a window having a mesh deposited on it, the microwave attenuation of the window exhibits a gradual increase with increasing wavelength, i.e. outside of the infrared or visible portions of the electromagnetic spectrum. Also, the attenuation provided at microwave frequencies by meshes deposited on insulating substrates is reduced at certain frequencies because of interference between the front and back surfaces of the substrate. Thus, the attenuation provided by the filter is dependent on the thickness of the substrate and the frequency of the miccowave signal striking the window. The pass/rejection characteristics of windows manufactured from semiconducting material are also inferior to those of an ideal filter. While a window manufactured from a semiconductor material will exhibit a relatively high attenuation of signals at wavelengths longer than infrared, it exhibits a decrease in attenuation of such signals as their wavelength increases (i.e. for microwave signals of lower frequency). Consequently, neither a mesh filter nor a semiconductor substrate along provide the desired response characteristics for an idealized short wavelength pass filter. The invention disclosed herein seeks to overcome the aforementioned deficiencies by providing a window filter, particularly useful for infrared and visible sensors and detectors, which provides broadband rejection of signals at microwave frequencies while minimizing the loss of signals at infrared and visible frequencies.

SUMMARY OF THE INVENTION

A primary object of this invention is to provide a short wavelength pass filter for use with infrared and visible detectors which permits the transmission of infrared and/or visible radiation with minimum absorption and which rejects, through reflection and absorption, longer wavelength radiation.

Another object of this invention is to provide a design for a short pass filter which may be manufactured with response characteristics chosen to permit the filter to be used with a variety of infrared and visible detectors having various spectral response characteristics.

Still another object is to provide a design for a short pass filter whose signal rejection characteristics may be chosen to reject microwave radiation longer than a selected wavelength.

In accordance with the teachings contained herein, the disclosed invention provides a short pass filter for use in connection with infrared and visible detectors and sensors. The filter includes a substrate or film manufactured from a semiconductor material which has been either doped or grown with impurities to provide it with a known electrical conductivity. A conductive grid is placed in contact with one or both surfaces of the semiconductor material. An alternate embodiment also disclosed herein includes a wire grid which is buried below one or both surfaces of the semiconducting material. The disclosed filter transmits short wavelength electromagnetic radiation in the infrared portion of the spectrum with minimum attenuation and rejects, through reflection and absorption, long wavelength radiation. The combination of the semiconducting material and a conductive grid permit the filter to exhibit higher transmission of infrared and/or visible signals and higher rejection of microwave signals than prior known filters, thereby providing greater discrimination between radiation of interest falling within the infrared and visible portions of the electromagnetic spectrum and radiation to be rejected i.e., RFI and EMI.

BRIEF DESCRIPTION OF THE DRAWINGS

The foregoing objects and advantages of the present invention may be more readily understood by one skilled in the art with reference being had to the following detailed description of a preferred embodiment thereof, taken in conjunction with the accompanying drawings in which.

DETAILED DESCRIPTION OF A PREFERRED EMBODIMENT

Figure 1:
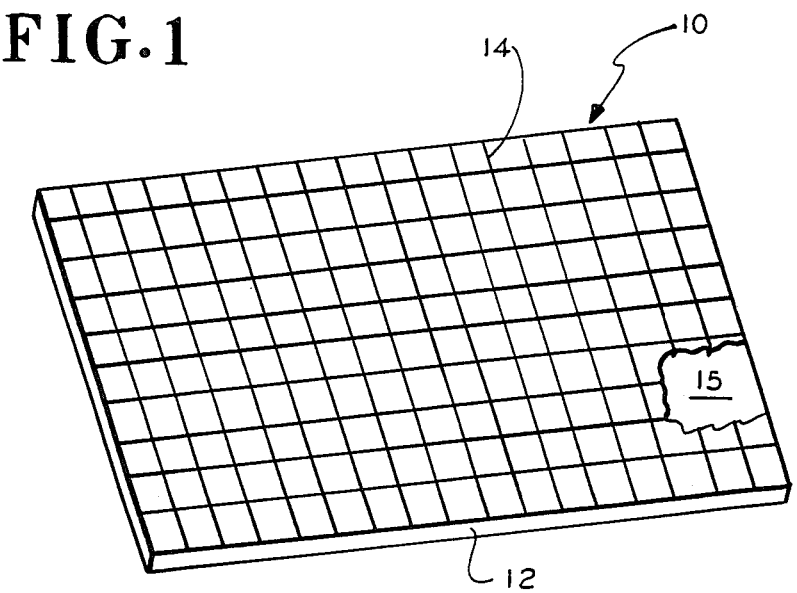
FIG. 1 shows a short pass filter constructed in accordance with the teachings of the invention.
Figure 1A:
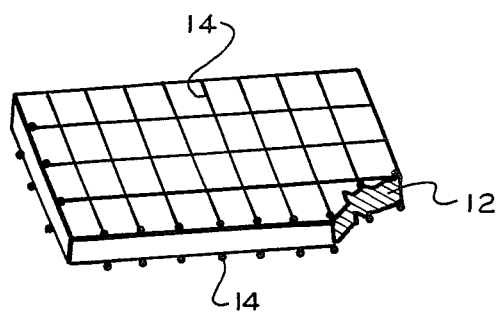
FIG. 1a shows a short pass filter having a semiconductor substrate and conductive meshes on the front and rear surfaces of the substrate.

Referring to the drawings, FIG. 1 shows an infrared filter 10 constructed in accordance with the teachings of the present invention. The filter is designed to transmit short wavelength electromagnetic radiation in the 8–12 μm band (i.e., infrared radiation) and reject, through reflection and absorption, long wavelength radiation, i.e. radiation in the range of microwave frequencies, from about 0.1 to 20 GHz. The filter 10 includes a substrate 12 manufactured from a semiconducting material which permits the efficient transmission of infrared radiation. Examples of suitable substrates for use as infrared filters include n or p-type gallium arsenide, or germanium. In addition to the foregoing, n or p-type silicon may be used in the mid-infrared wavelength region, i.e., 3 to 5 μm. In the specific example disclosed herein, the substrate is doped in any conventional, known manner to produce a resistivity of approximately 10 Ohm-cm. The substrate may be doped with a variety of dopants, well known to those skilled in working with semiconductor materials. Examples of such dopants include, but are not necessarily limited to, boron, aluminum, gallium, phosphorous, arsenic and antimony. The actual dopant which is used is unimportant, especially if the desired resistivity is high, i.e. greater than 0.5 Ohm-cm. In fact, a specific dopant need not be added to the semiconducting material if contaminants in the semiconductor material provide the desired resistivity. In the case of the specific example disclosed herein, the substrate 12 is manufactured from n-type germanium which has been doped with antimony to provide the aforementioned resistivity of 10 Ohm-cm.

Figure 2:
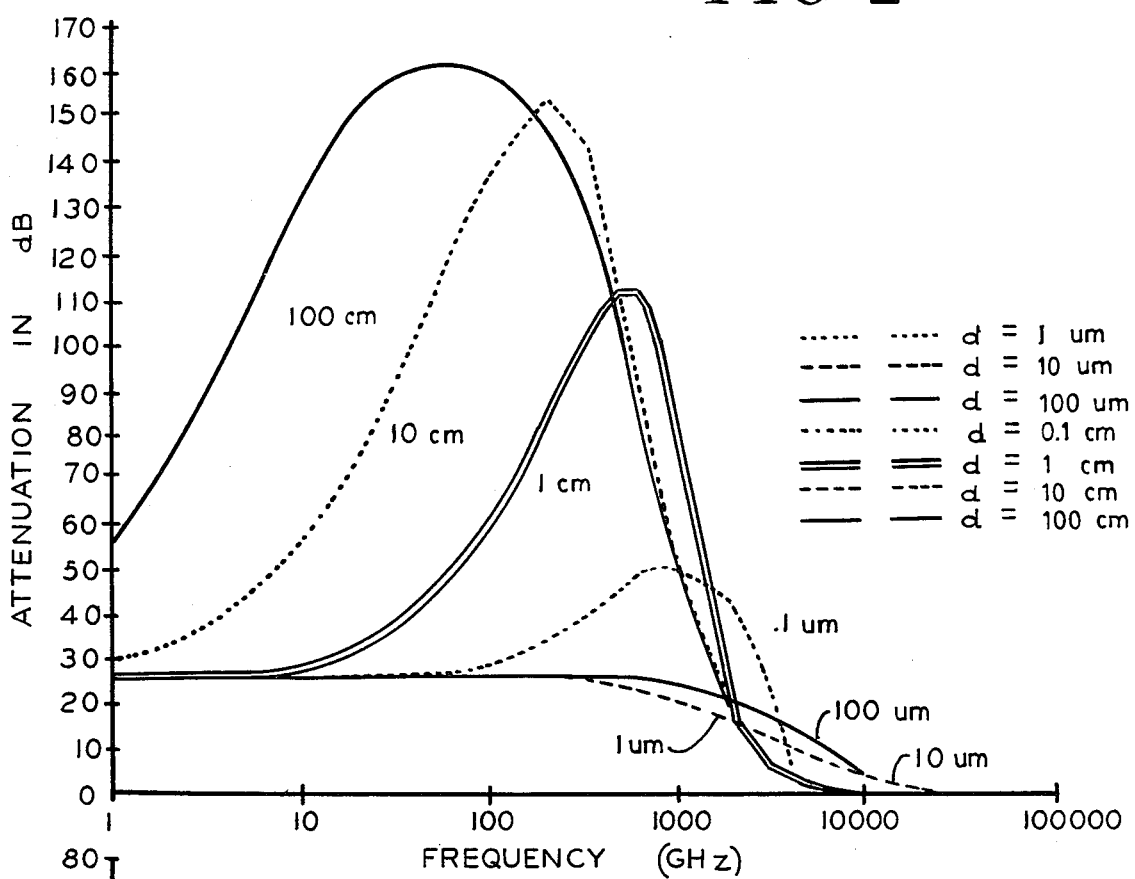
FIG. 2 is a graph showing the theoretical attenuation at microwave frequencies of conductors of various thicknesses having a sheet resistivity of 10 Ohms/square.

The sheet resistivity, Po/d, of the conductive material (i.e., the substrate 12) determines the minimum microwave attenuation that will be achieved by the conductive material alone. This attenuation, A, in decibels, is calculated from the following equation $$A = 20 \log \left[ \frac{188.365 d}{P_o} + 1 \right] \quad (1)$$

where d is the thickness of the conductor (substrate 12) and Po is the DC resistivity. The long wavelength attenuation of the conductor will remain constant as long as the ratio, Po/d, is constant. FIG. 2 shows the attenuations of conductors of various thicknesses which all have the same sheet resistivity. In each case, the long wavelength attenuation is greater than 25.9 dB as calculated from the above equation. The thickness and conductivity of the conductive material are selected by the designer for each application. Referring once again to the specific example disclosed above, a 1 cm thick layer of germanium may be used as a substrate for the filter to permit transmission in the 8–12 μm band and rejection of microwave signals from about 0.1 to 20 GHz.

FIG. 2 shows a series of parametric curves which may be used to select the appropriate thickness of the conductor for an application of interest. As will be best noted from FIG. 2, higher attenuation of signals at microwave frequencies and lower attenuations of signals at infrared and visible frequencies may be achieved by the use of a thicker substrate. The attenuation curves of FIG. 2 have been calculated from Drude and multilayer thin film theory.

Figure 3:
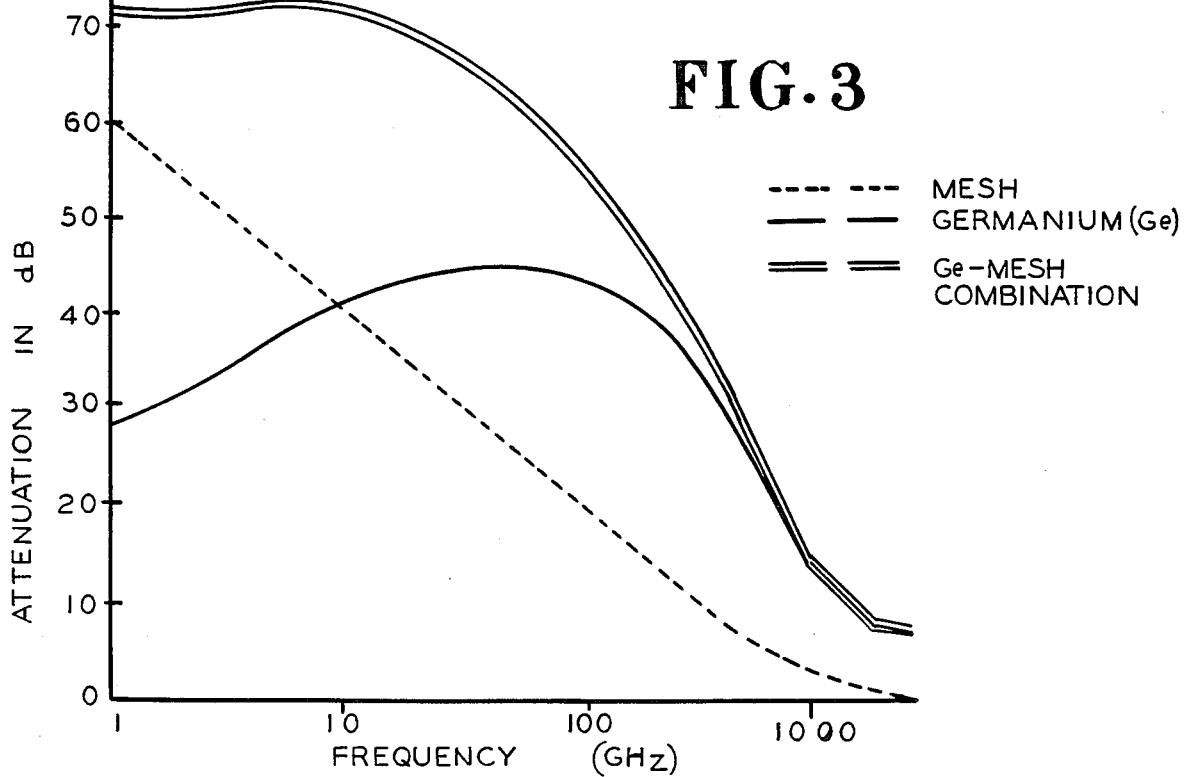
FIG. 3 is a graph comparing the theoretical microwave attenuation of a 1 centimeter thick slab of 10 Ohm-cm n-type germanium with the theoretical attenuation of a mesh alone and the theoretical attenuation of a mesh-semiconductor combination.
Figure 4:
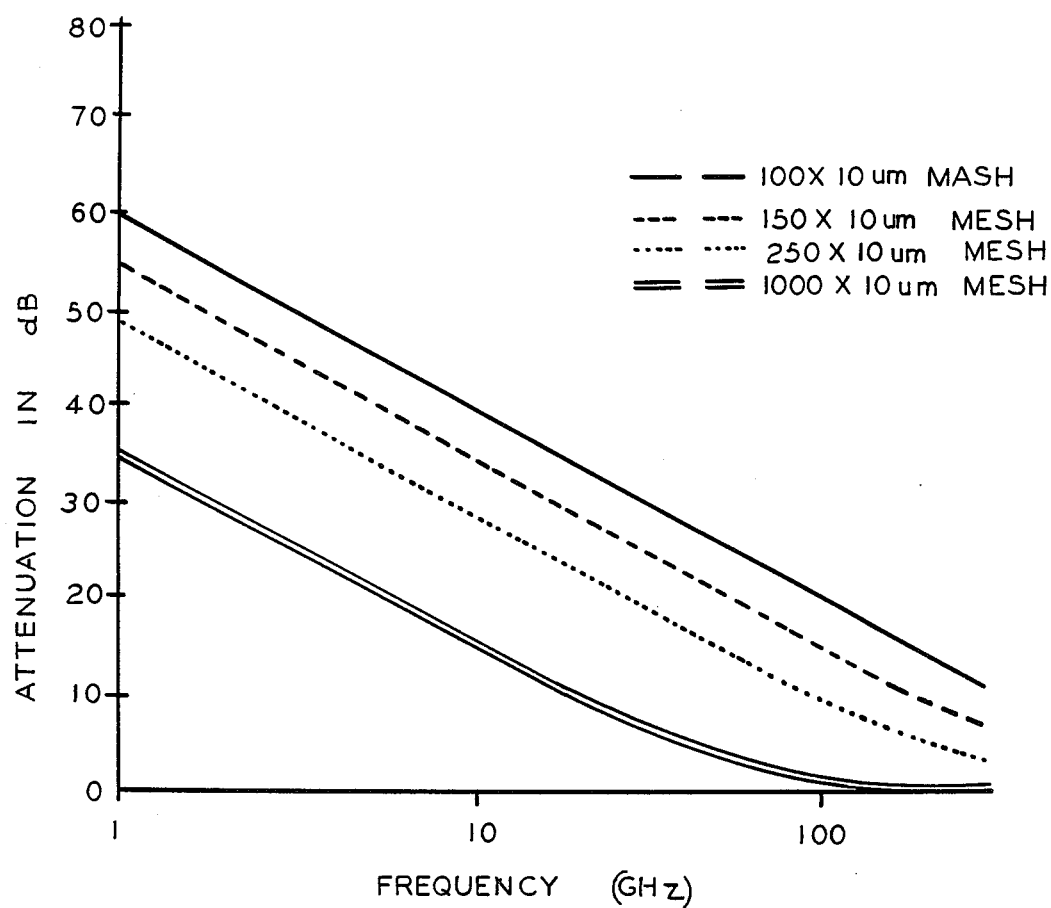
FIG. 4 is a graph showing the theoretical attenuation of meshes of various periods at microwave frequencies.

FIG. 3 compares the theoretical attenuation provided by the 1 cm thick germanium substrate having a resistivity of 10 Ohm-cm at microwave and infrared frequencies to the attenuation provided by a mesh having a 100 μm period and a 10 μm line width. Also shown in FIG. 3 is the theoretical attenuation of a composite filter constructed in accordance with the teachings of the disclosed invention, i.e., using a combination of a semiconducting substrate and a mesh. The absorption coefficient of the germanium filter at room temperature is less than 0.02 per cm at 10.6 μm. As shown in FIG. 3, the attenuation at all frequencies below about 160 GHz is greater than 25.9 dB.

The rejection of the filter at microwave frequencies may be improved by adding a mesh to the front or rear surface of the substrate 12. FIG. 3 shows that if a conductive mesh 14 made, for example, from aluminum and having a 100 μm period and a 10 μm line width is placed on the front surface 15 of the substrate 12, the low frequency attenuation is increased from 28 dB to greater than 70 dB. The aluminum film from which the mesh is fabricated must be thick enough to produce the desired attenuation. From FIG. 3, it can be seen that the mesh alone has an attenuation of approximately 60 dB at a frequency of 1 GHz. Therefore, the metal film should be designed to have an attenuation of at least 70 to 80 dB. Equation (1) can be used to calculate the desired thickness of the metal mesh. Using equation (1), the thickness of the aluminum film must be greater than 0.47 μm thick for 70 dB of attenuation. For 80 dB of attenuation a film 1.50 μm thick is needed. Additional loss in the infrared attributable to diffraction and reflection from the grid structure is approximately 20%. Meshes having larger periods will exhibit even lower losses of infrared energy.

Figure 5:
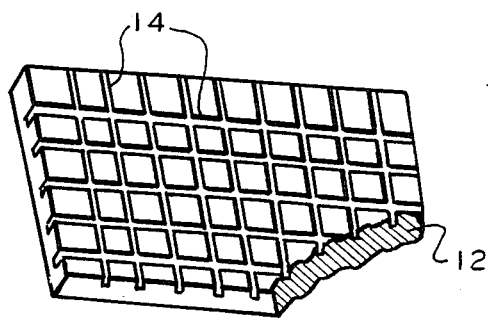
FIG. 5 shows a filter having a substrate manufactured from a semiconducting material which contains a metal mesh buried in the front surface of the substrate.

The preferred embodiment disclosed herein has been described as having the metal grid located on the front or rear surface of the semiconductor substrate. The disclosed invention may also be constructed with a metal grid which is buried in either the front or rear surface of the semiconductor substrate (FIG. 5). A method for burying a metal grid on the surface of a substrate is more fully described in co-pending U.S. patent application Ser. No. 155,430 filed Feb. 12, 1988 which is owned by the assignee of the invention disclosed herein and the teachings of which are incorporated herein by reference.

Figure 6:
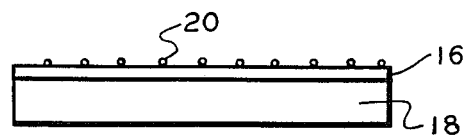
FIG. 6 shows a side view of a filter having an electrically insulating substrate with a semiconducting film on one side thereof and a metal grid on the semiconducting layer.

It is also within the scope of the teachings of the present invention to use a semiconductor film 16, for example a layer of indium oxide doped with tin which has been deposited on a glassy or infrared or visible transmitting substrate 18, for example a substrate made from insulting glass or zinc sulfide or zinc selenide. Such a filter will exhibit good short wavelength transmission characteristics while rejecting microwave radiation. A metal grid 20 placed on such a semiconducting layer (FIG. 6) would produce the desired filter characteristics described herein and would have the additional advantage of being capable of transmitting visible radiation in addition to infrared radiation.

While a preferred embodiment has been described herein in sufficient detail to permit one skilled in the art to understand and to make the claimed invention, it should be apparent that the teachings and disclosure of the present invention will suggest many other embodiments and variations to those skilled in the art. It is intended that all such embodiments be covered by the permissible scope of coverage of the patent, and that the breadth of such coverage only be limited by the claims appended hereto.

I claim:

1. A filter which transmits electromagnetic signals in the infrared and/or visible wavelength and which rejects electromagnetic signals in the microwave wavelength, said filter including:
    a. a substrate manufactured from a semiconducting material which transmits infrared and/or visible radiation with minimum absorption, said substrate having a front surface and rear surface; and
    b. a conductive metal mesh for rejecting electromagnetic signals in the microwave wavelength said metal mesh being placed in contact with said substrate;
    whereby signals in the infrared and/or visible portion of the electromagnetic spectrum pass through said filter with minimum absorption and signals in the microwave portion of the electromagnetic spectrum are rejected.

2. The filter of claim 1 wherein said metal mesh is on the front surface of said substrate.

3. The filter of claim 2 further including a second metal mesh on the rear surface of said substrate.

4. The filter of claim 1 wherein said metal mesh is on the rear surface of said substrate.

5. A filter which transmits signals in the infrared and/or visible portions of the electromagnetic spectrum and which rejects electromagnetic signals of microwave wavelengths, said filter including:
    a. a substrate manufactured from an electrically insulating material, said substrate having a first and a second side;
    b. a film manufactured from a semiconducting material which transmits infrared and/or visible radiation with minimum absorption, said film being located on one side of said substrate; and
    c. a conductive mesh in contact with said substrate for rejecting electromagnetic signals of microwave wavelengths;
    whereby signals having wavelengths corresponding to the infrared and/or visible portions of the electromagnetic spectrum pass through said filter with minimum absorption and signals having wavelengths corresponding to the microwave portion of the electromagnetic spectrum are rejected.

6. A filter which transmits signals in the infrared and/or visible wavelength and which rejects electromagnetic signals of microwave wavelengths, said filter including:
    a. a substrate manufactured from a semiconducting material which transmits infrared and/or visible radiation with minimum absorption, said substrate having a front surface and a rear surface; and
    b. a metal mesh for rejecting electromagnetic signals of microwave wavelengths, said metal mesh being buried on the front surface of said substrate;
    whereby signals having wavelengths corresponding to the infrared and/or visible portions of the electromagnetic spectrum pass through said filter with minimum absorption and signals having wavelengths corresponding to the microwave portion of the electromagnetic spectrum are rejected.

7. The filter set forth in claim 6 wherein said mesh has grid dimensions of 100 by 10 $\mu$m.

8. The filter set forth in claim 7 wherein said substrate is n-type germanium.

9. The filter set forth in claim 8 wherein said substrate has a resistivity of about 10 Ohm-cm.

* * * * *